July 20, 1965     A. A. HAYATIAN     3,195,962
SEAL FOR TRACK LINKS
Filed March 25, 1963
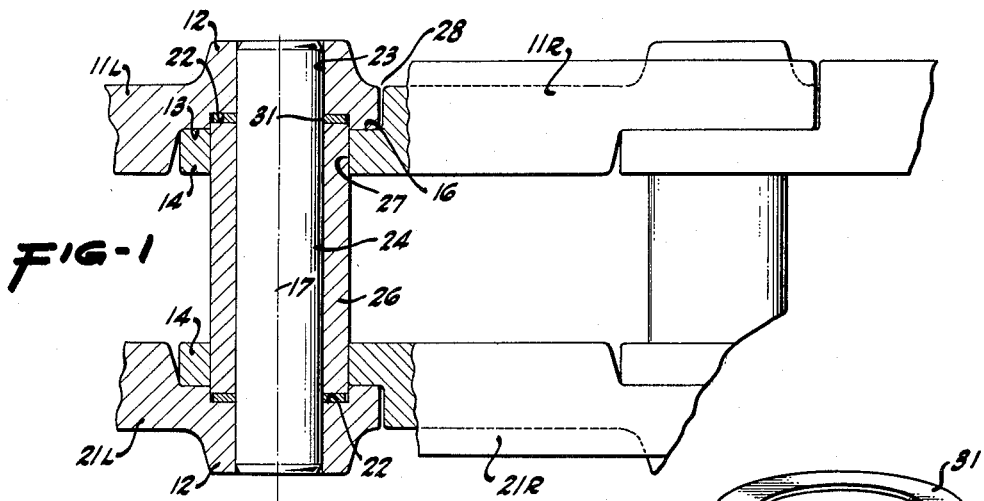
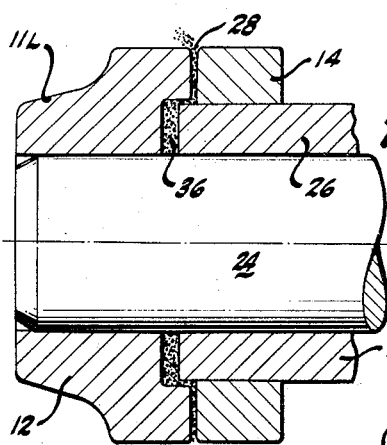
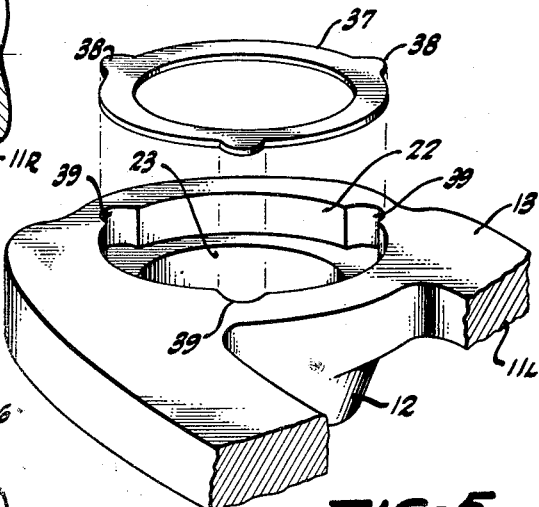
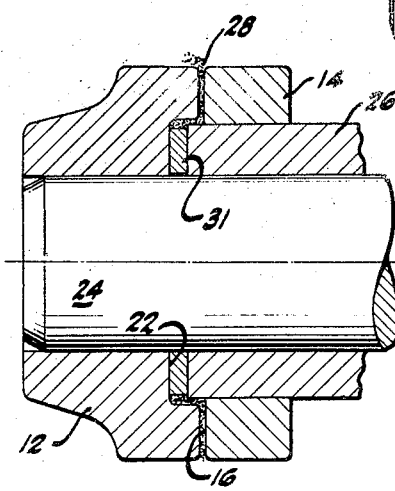
INVENTOR.
ALLAN A. HAYATIAN
BY
ATTORNEY

United States Patent Office 3,195,962
Patented July 20, 1965

3,195,962
SEAL FOR TRACK LINKS
Allan A. Hayatian, Lomita, Calif., assignor to
Westrac Company, Torrance, Calif.
Filed Mar. 25, 1963, Ser. No. 267,615
2 Claims. (Cl. 305—11)

This invention relates to a new and improved seal for track links. More particularly, the invention relates to a seal of the type used surrounding the pin of the endless track used on crawler-type tractors. The track shoes of crawler-type tractors are attached to an endless chain disposed on either side of the tractor. The chain is necessarily flexible in that it passes around a driving sprocket at one end of the track and an idler sprocket at the opposite end which requires the individual links of the chain to flex or oscillate relative to each other as the chain adapts itself to an arcuate configuration as distinguished from the straight line configuration between sprockets. Further, it is essential, in order that the tractor accommodate unevenness of the terrain and other factors, that the links of the chain flex between the sprockets. To facilitate movement of one link relative to the other it is common to provide a pin interconnecting the ends of the two pairs of links making up the chain. The outer links are formed at the point through which the pin passes with a counterbore. The inner pair of links at their ends are formed with an enlarged diameter bore into which is pressed a sleeve surrounding the pin. The pin is fixed non-rotatively with respect to the first-mentioned pair of links while the sleeve or bushing is fixed non-rotatively with respect to the second-mentioned pair of links. Hence, the flexing movement of the links relative to each other is accommodated by rotation of the sleeve or bushing about the pin. As hereinafter explained in greater detail, various foreign elements tend to work their way between the links and to enter the space in the counterbore of the outer pair of links into which the end of the sleeve fits. With the passage of time, these foreign elements cause wear of the mating parts and eventually repair thereof. An object of the present invention is to provide a seal which fits into the counterbore of the outer link and bears against the end of the sleeve or bushing in such fashion as to fill the space worn in the link prior to repair and hence to deter the entry of additional foreign material which would otherwise quickly reduce the life of the repaired links.

The foreign material which tends to enter into the space between the links is inherent in the operating condition of the tractor inasmuch as the tracks frequently operate in dirt, sand, mud, gravel, dust and other abrasive material. Further, the pressure exerted on such materials by the track is very severe, thus forcing finely divided materials between the links. As the foreign material abrades the surfaces heretofore mentioned, the condition worsens in that space for entry of additional material widens. The limited space available for the sealing means hereinafter described greatly restricts the type of seal which may be installed. A feature of the invention is the small space which the seal occupies.

The present invention has particular utility in restoring, as near as possible, to the original effectiveness worn out track link counterbores of the type previously described. It will be understood that complete sealing against entry of abrasive material into the counterbore of a track link is practically impossible. With the passage of time, wear occurs and requires replacement of pins and bushings. Nevertheless, the enlarged counterbore permits new abrasive material to enter which rapidly wears and soon requires still further replacement of additional worn parts. It is a feature of the present invention to provide a specially hardened flat seal washer which is inserted in the counterbore of the outer track link and functions to restore the effective shape of the counterbore to the original factory dimensions thereof.

When a new pin and bushing is used in the restoration of a track link assembly by reason of prior wear of the counterbore occasioned by abrasive materials entering between the end of the bushing and the counterbore, said counterbore provides a vacant area through which new grit, dirt and abrasives may enter and hence wear the mating parts anew. Such wear causes the tracks to become snaky and thereby reduces the roller, idler and sprocket life. The present invention provides a single, hardened steel washer which is inserted in the bottom of each counterbore and forms a dirt-blocking seal by filling the gap that would ordinarily be present. Such washer not only restores the original dimensions to the counterbore of the track but, further, such seal absorbs most of the additional wear which occurs and hence preserves the life of the links in which it is installed, since it is relatively inexpensive to replace the washer as compared with the link.

A feature and advantage of the invention is the fact that the seal is simple and inexpensive, easily installed and replaced, and has a long life.

Other objects of the present invention will become apparent upon reading the following specification and referring to the accompanying drawings in which similar characters of reference represent corresponding parts in each of the several views.

In the drawings:

FIG. 1 is a fragmentary top plan view, partly broken away in section, showing assembled track links in accordance with the present invention.

FIG. 2 is an enlarged sectional view of a portion of FIG. 1, showing the links after wear and showing abrasive material in the aforementioned space.

FIG. 3 is a view similar to FIG. 2, showing a washer in the space in accordance with this invention.

FIG. 4 is a perspective view of the washer.

FIG. 5 is an exploded perspective view of a modified washer and link.

The links 11 shown in the accompanying drawings are of a well-known type commercially available. At the right-hand end, as viewed in FIG. 1, each link has a laterally outwardly offset boss 12 and, further, is relieved at its inner face as shown by reference numeral 13 to permit overlapping of the right-hand end 14 of the adjacent link. Right-hand end 14 is relieved at its outer face as indicated by reference numeral 16 to accommodate the end of the first-mentioned link. It is essential that the two adjacent links 11L and 11R, as designated in FIG. 1, flex relative to each other about axis 17 as the chain travels around the drive and idler sprockets (not shown) which drive the track. It is also apparent from FIG. 1 that the links 11 are arranged in pairs on the inside and outside of the tractor. Thus, link 11L has as its mate link 21L which is the same in construction but oppositely facing.

The inner face of boss 12 is formed with a counterbore 22 of substantial depth surrounding the central bore 23 of said boss 12, bores 22 and 23 having the common axis 17. Fitting into bore 23 with a forced fit is pin 24 which interconnects the pair of links 11L, 21L. Surrounding pin 24 is a sleeve or bushing 26 which can rotate or oscillate relative to pin 24. Bushing 26 is forced into the bore 27 of end 14 of link 11R and its outer end enters counterbore 22 but does not reach the bottom thereof. The diameter of counterbore 22 is slightly greater than the outside diameter of bushing 26. Accordingly, bushing 26 turns relative to boss 12 but not relative to end 14, whereas pin 24 turns inside bushing 26 but does not turn relative to boss 12. Bushing 26 enters the corresponding counterbore 22 in the boss 12 of link 21L.

It is apparent that abrasive and other foreign material, particularly of the type heretobefore described, enters into the crevice, indicated by reference numeral 28 in FIG. 1, between the adjacent links 11L and 11R and also into the interface between offsets 13 and 16 and thence between the outside of bushing 26 and the cylindrical surface of counterbore 22, as indicated by reference numeral 36. Once such abrasive material enters entirely through the passage heretofore described it works against the relatively oscillating surfaces causing rapid deterioration necessitating repair or replacement of the link members. More particularly, the end of bushing 26 deepens counterbore 22.

The seal, which is the subject of this invention, comprises a single, flat, hardened steel washer having an outside diameter slightly less than the diameter of the counterbore 22 in which it is installed, and an inner diameter slightly greater than the diameter of pin 24. By reason of prior wear of the assembly before it is repaired, the counterbore 22 tends to deepen and hence, were it not for the seal of the present invention, a gap 36 would exist between the end of bushing 26 and the bottom of counterbore 22, despite replacement of bushing 26 and pin 24. Such gap 36 is filled by the washer 31, so that there is a tight fit between washer 31 and the bottom of counterbore 22 and the end of bushing 26 which protect against entry of foreign material. The wear between the relatively oscillating bushing 26 and boss 12 is largely absorbed by washer 31, as distinguished from additional deepening of the counterbore 22.

In the form of the invention as shown in FIG. 5, washer 37 is formed with one or more outward projecting, substantially semi-circular ears 38, here shown as three in number. It will be understood that the number of such ears 38 is subject to variation. The counterbore 22 is formed with complementary semi-circular offsets 39 into which the ears 38 fit. This arrangement prevents rotation of washer 37 relative to link 11L and insures that wear will be confined to the surface of washer 37 which engages bushing 26. Accordingly, the life of link 11 as distinguished from the life of bushing 26 is preserved, it being obvious that bushing 26 is less expensive to replace than link 11.

Although the foregoing invention has been described in some detail, by way of illustration and example for purposes of clarity of understanding, it is understood that certain changes and modifications may be practiced within the spirit of the invention and scope of the appended claims.

What is claimed is:

1. A method of repairing a track link assembly worn by prolonged abrasion, said assembly of the type having an outer first link having at a first end thereof a laterally outward offset boss and a flat inner face facing inward on the inner side of said boss, said first link formed with a first bore extending through said boss normal to said inner face and a counterbore in said inner face coaxial with said first bore, a second link having a second end partially overlapping said first end and oscillatable relative to said first link about the axis of said first bore, said second end having an outer face parallel and inwardly offset relative to said inner face, said second link formed with a second bore normal to and extending through said outer face coaxial with said first bore, said second bore of a diameter larger than said first bore and slightly less than said counterbore, a bushing force fit in said second bore with its outer end projecting beyond said outer face and partially into said counterbore and turnable in said counterbore relative to said first link, and a pin turnable inside said bushing and having an outer end force fit in said first bore, and in which by reason of said prolonged wear the depth of said counterbore is such that the outer end of said bushing is separated from the bottom of said counterbore by a space, which said space is substantially larger than the original distance between the outer end of said bushing and the bottom of said counterbore before such prolonged wear occurred, and which said space permits ingress of abrasive material between said bushing and the bottom of aid counterbore with consequent rapid enlargement of said space, said method comprising disassembling said assembly by removing said outer end of said pin from said first bore, placing a hardened flat washer over said outer end of said pin dimensioned to fill said space, replacing said bushing with a new bushing of substantially the same diameter and length as the previous bushing before such prolonged wear occurred, replacing said pin with a new pin of substantially the same diameter as the previous pin before such prolonged wear occurred, and reassembling said assembly by forcing said outer end of said new pin into said first bore, said washer bearing against the bottom of said counterbore and the outer end of said new bushing and substantially occupying said space whereby ingress of abrasive material between said bushing and the bottom of said counterbore is substantially prevented.

2. A method according to claim 1, which further comprises securing said washer from rotation relative to said first link.

References Cited by the Examiner

UNITED STATES PATENTS

| | | | |
|---|---|---|---|
| 2,115,227 | 4/38 | Kuchar | 305—48 |
| 2,906,562 | 9/59 | Burgman | 305—11 |
| 3,050,346 | 8/62 | Simpson et al. | 305—11 |
| 3,060,761 | 10/62 | Barkley | 305—11 |
| 3,110,524 | 11/63 | Zeller et al. | 305—11 |

ARTHUR L. LA POINT, *Primary Examiner.*